April 29, 1930.    H. E. WURZBACH ET AL    1,756,619
CHECK CONTROLLED APPARATUS
Filed Jan. 25, 1928    9 Sheets-Sheet 5
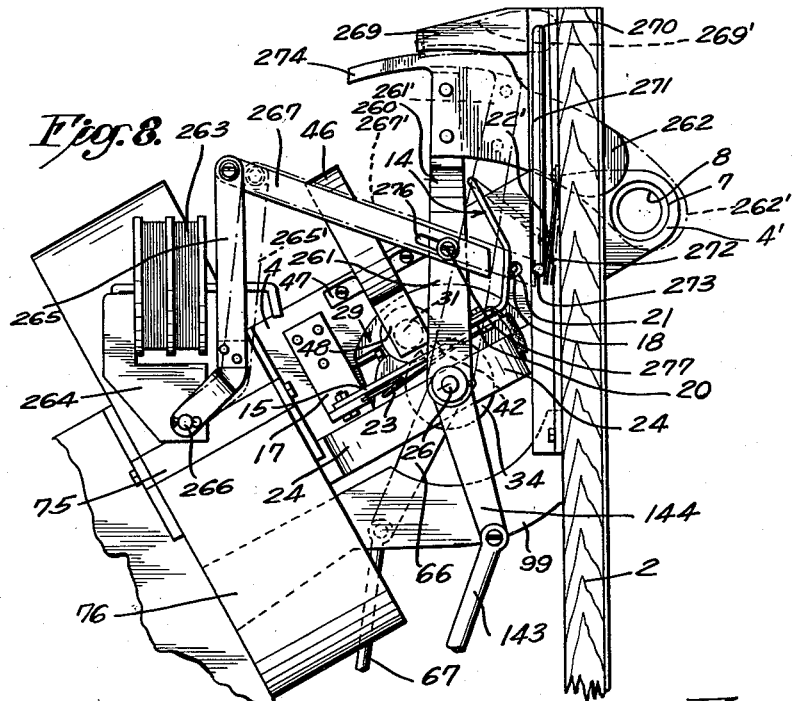
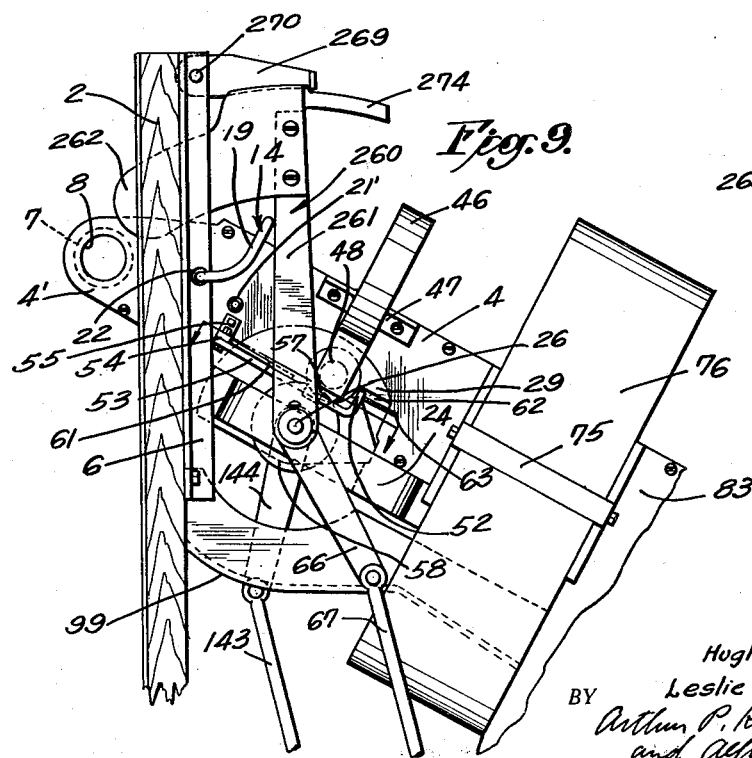
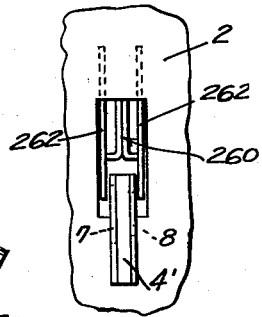
INVENTOR.
Hugh. E. Wurzbach
Leslie H. Wadsworth
BY Arthur P. Knight
and Alfred W. Knight
ATTORNEYS April 29, 1930.  H. E. WURZBACH ET AL  1,756,619
CHECK CONTROLLED APPARATUS
Filed Jan. 25, 1928   9 Sheets-Sheet 6
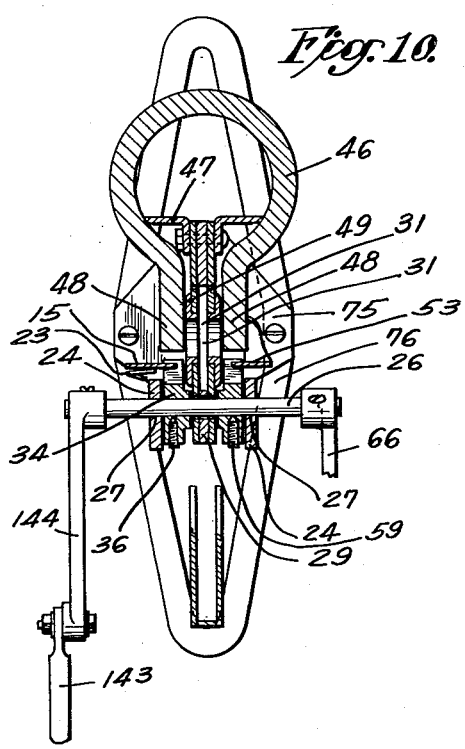
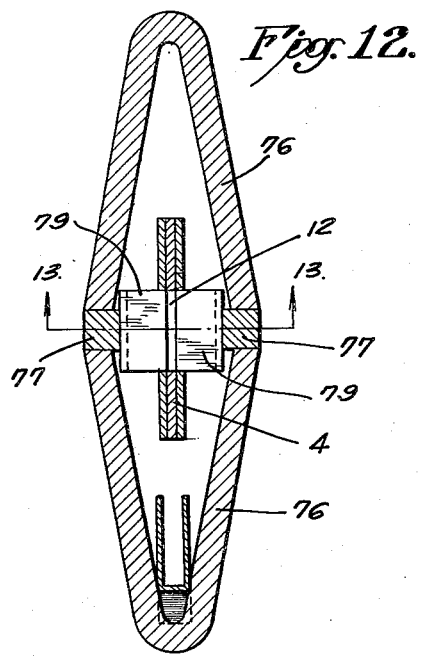
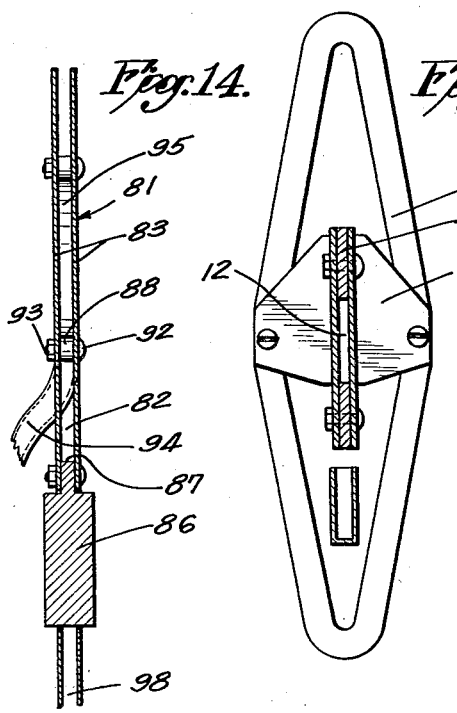
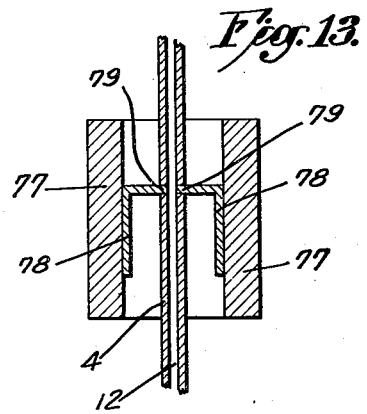
INVENTOR.
Hugh E. Wurzbach
Leslie H. Wadsworth
BY Arthur P. Knight
and Alfred W. Knight
ATTORNEYS

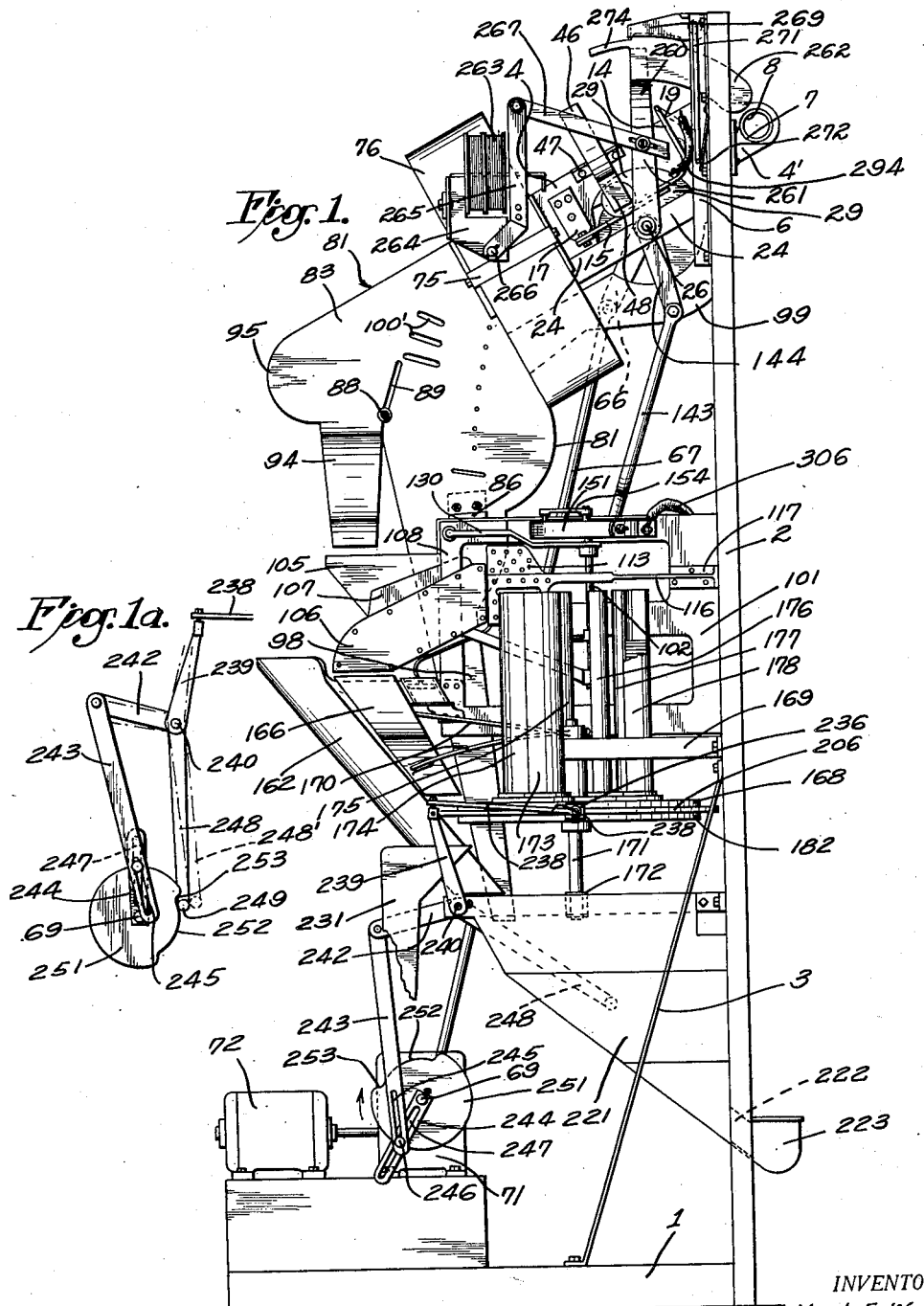

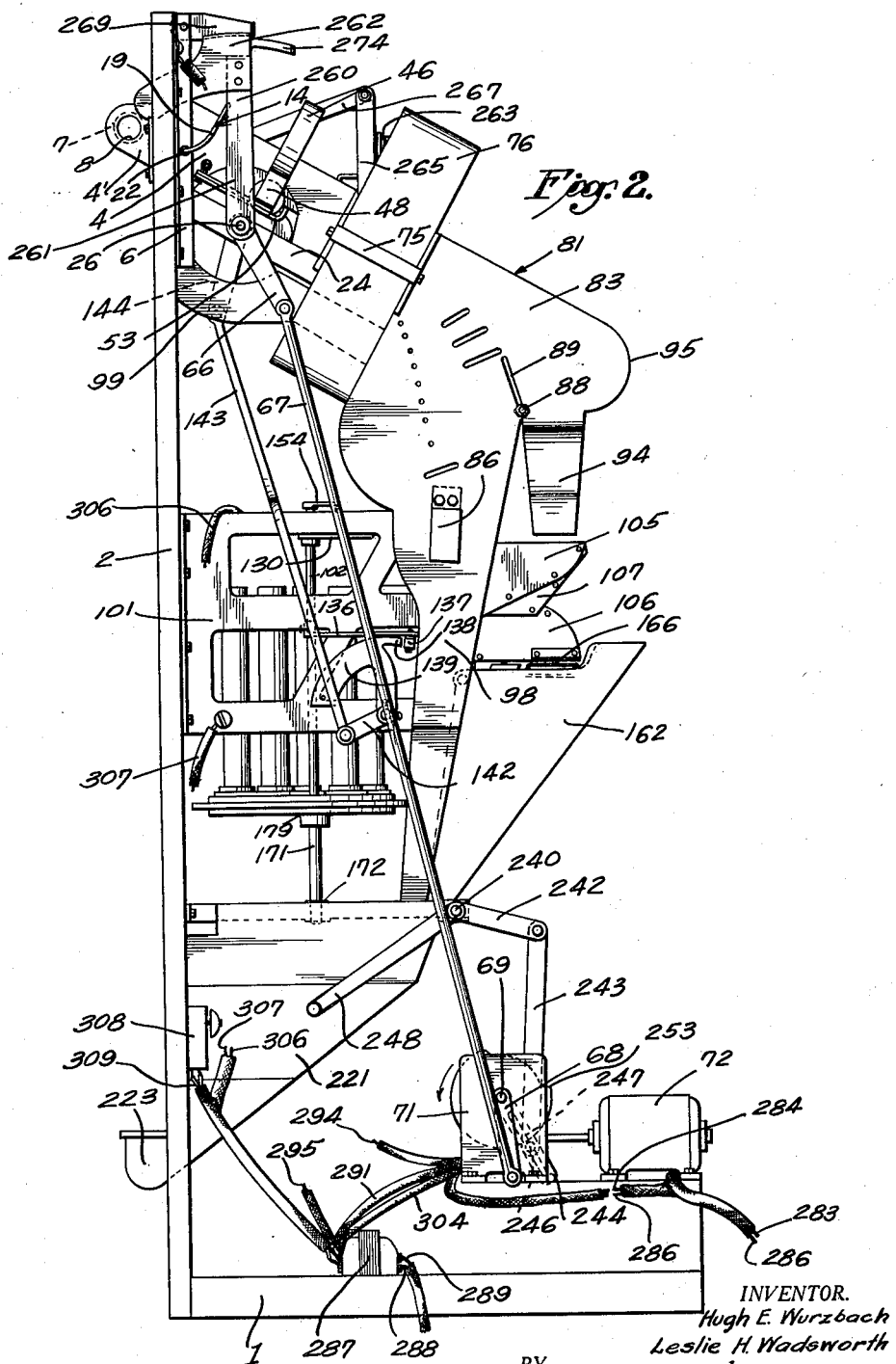

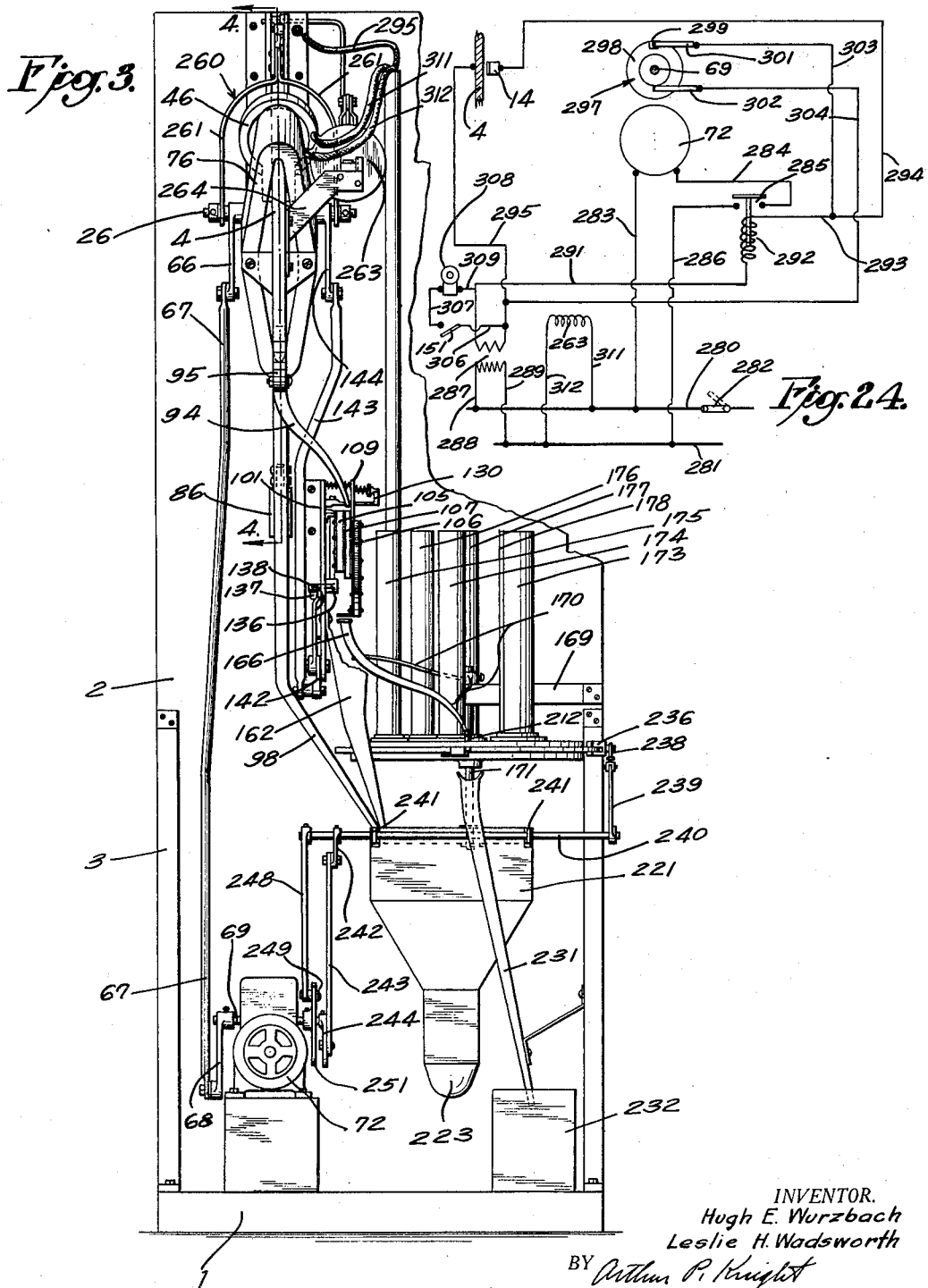

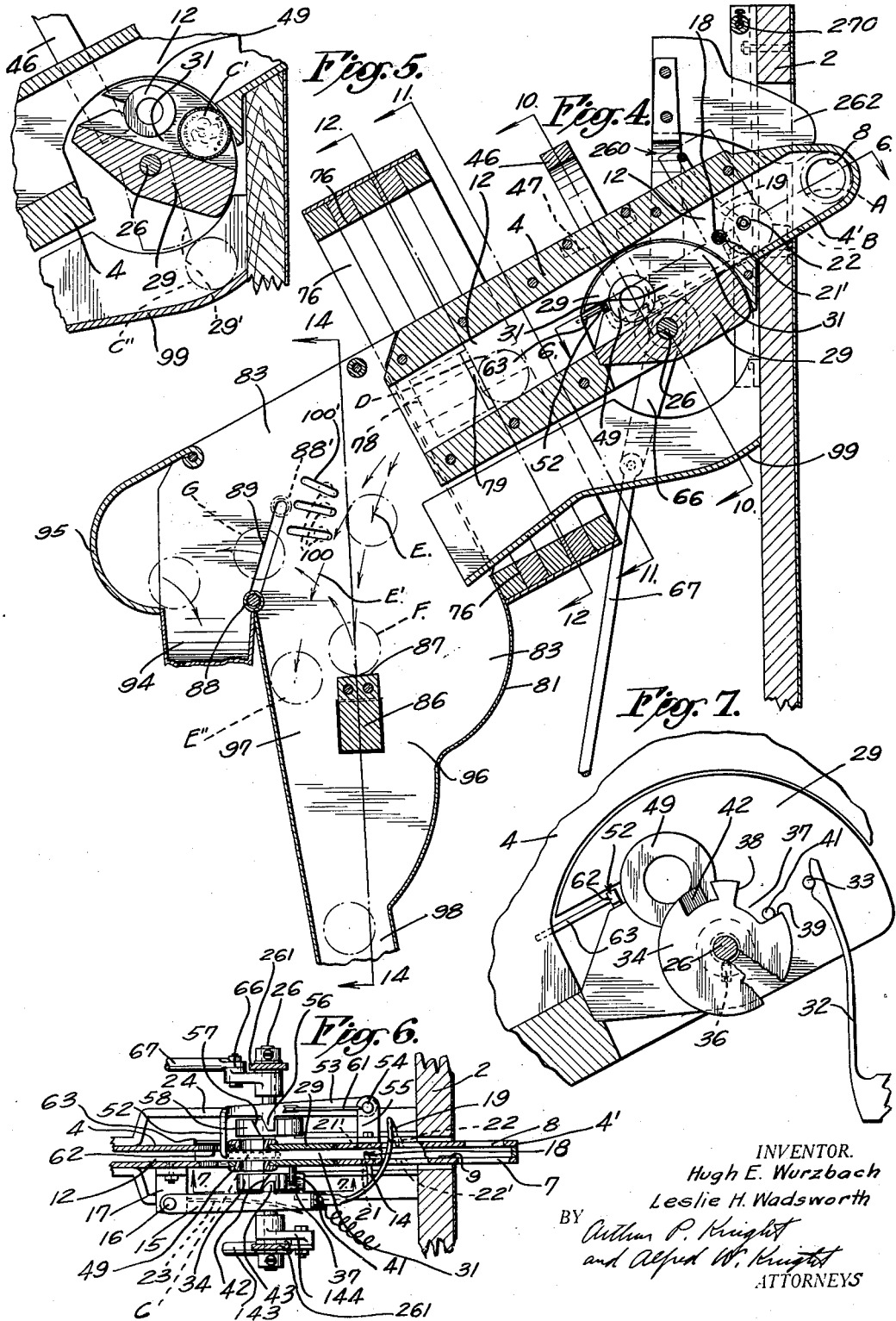

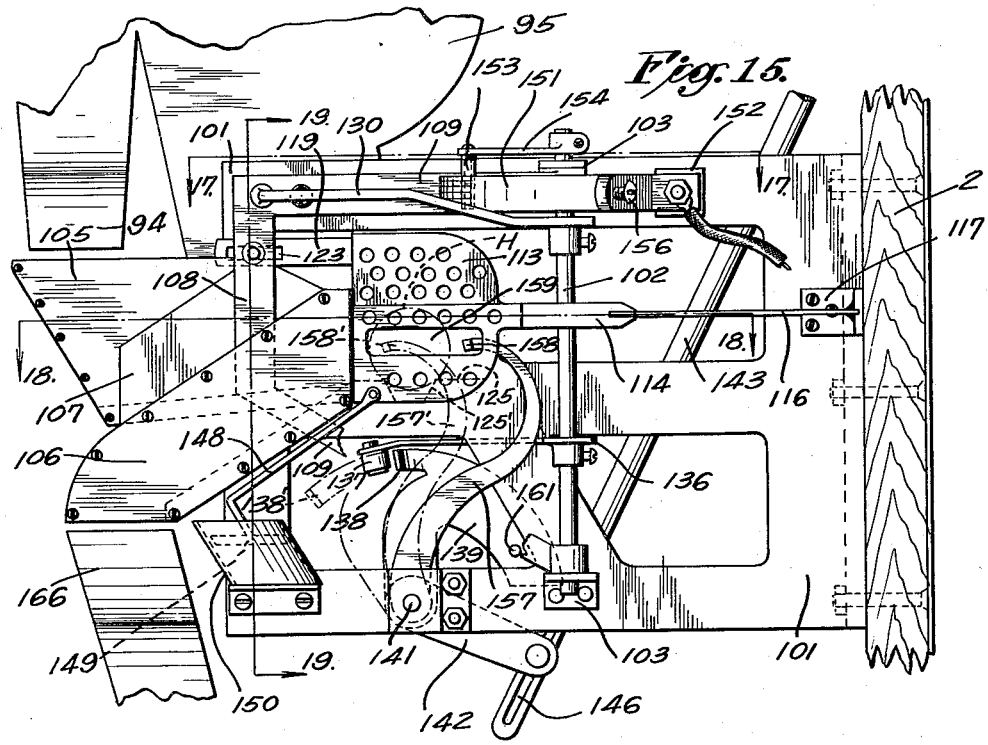
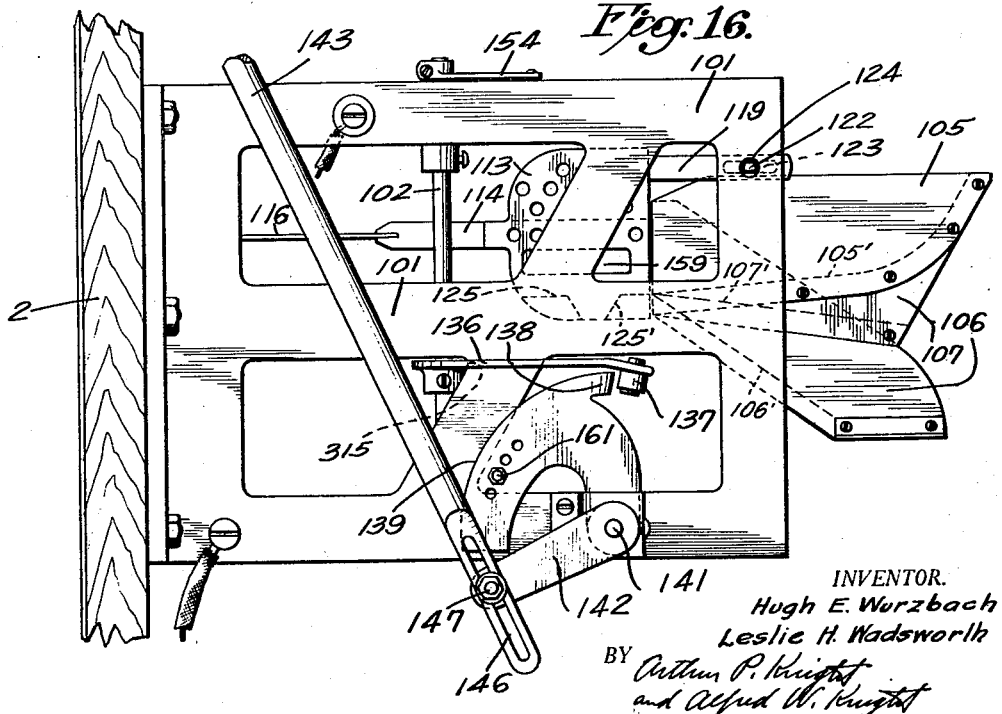

April 29, 1930.  H. E. WURZBACH ET AL  1,756,619
CHECK CONTROLLED APPARATUS
Filed Jan. 25, 1928    9 Sheets-Sheet 8
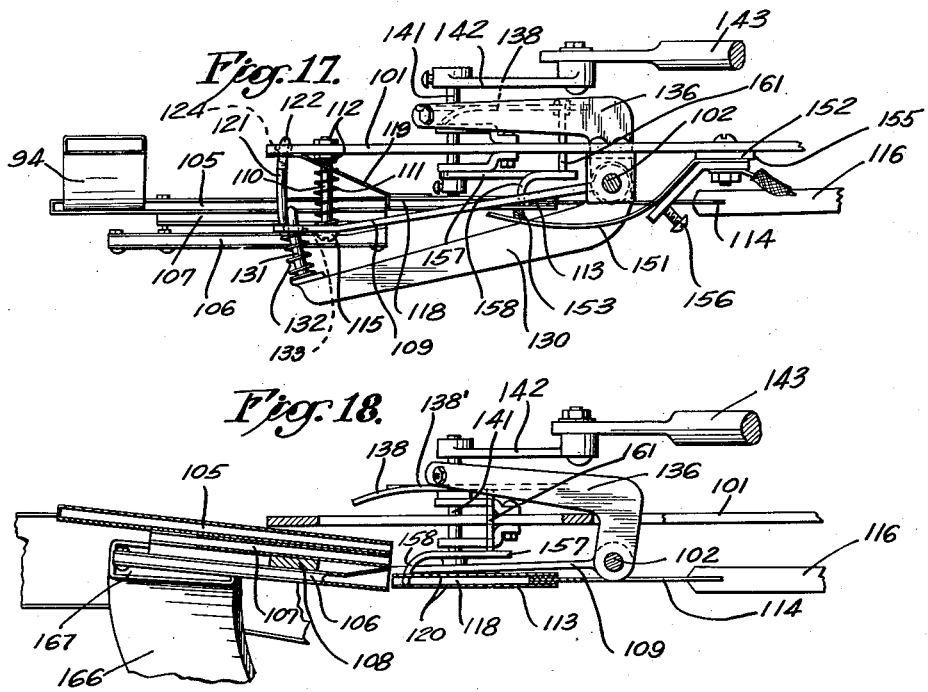
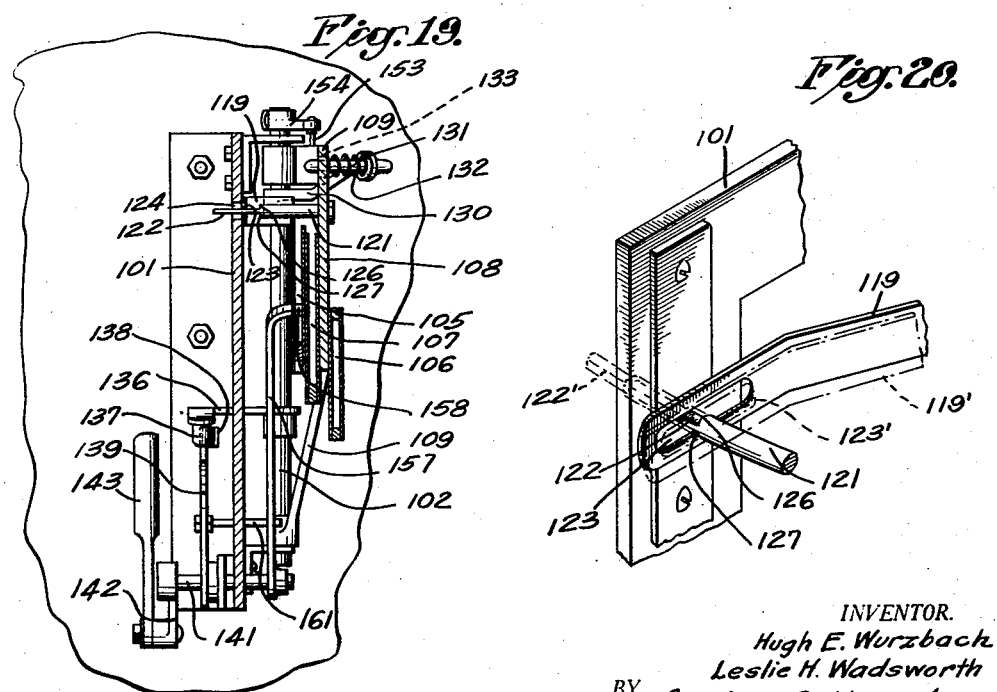
INVENTOR.
Hugh E. Wurzbach
Leslie H. Wadsworth
BY Arthur P. Knight
and Alfred W. Knight
ATTORNEYS

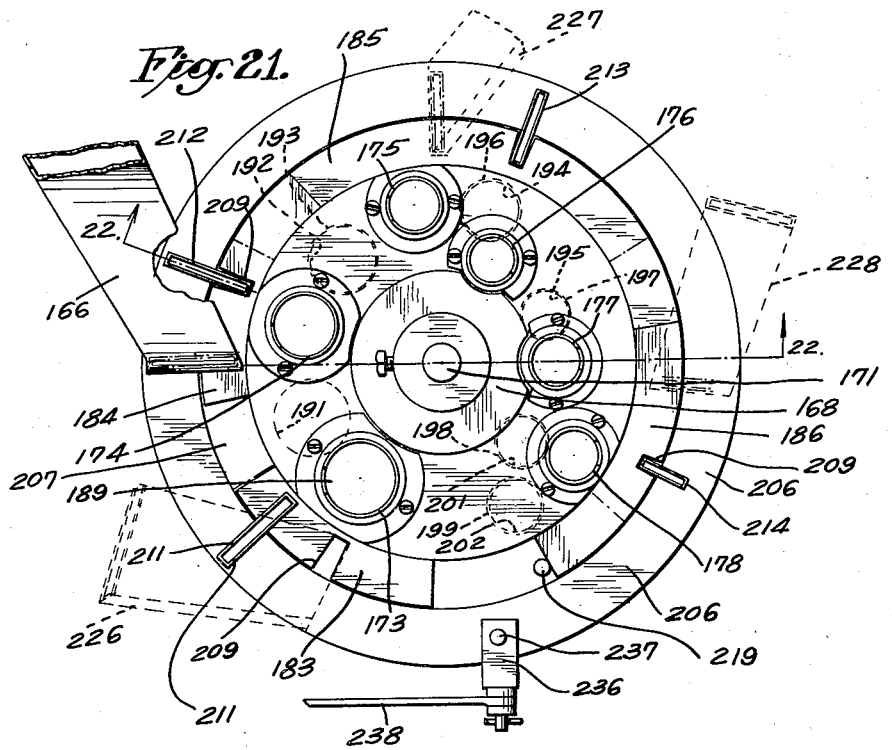
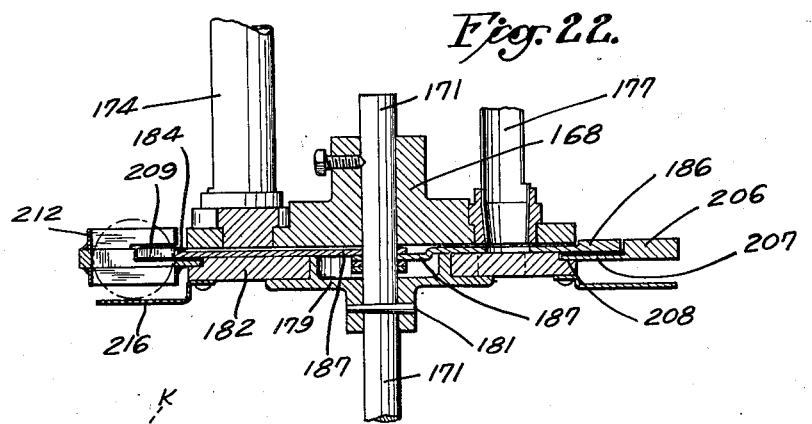
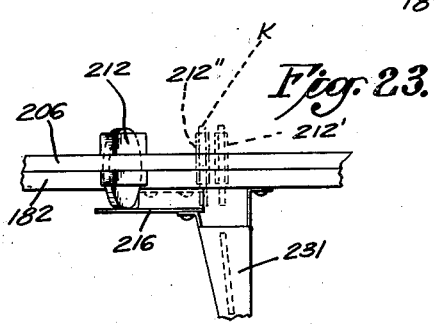

Patented Apr. 29, 1930

1,756,619

UNITED STATES PATENT OFFICE

HUGH E. WURZBACH AND LESLIE H. WADSWORTH, OF MAGNA, UTAH, ASSIGNORS TO SELECTOR CORPORATION, OF SALT LAKE CITY, UTAH, A CORPORATION OF UTAH

CHECK-CONTROLLED APPARATUS

Application filed January 25, 1928. Serial No. 249,438.

This invention relates to apparatus controlled or operated by insertion of a metal coin or check therein and has to do particularly with means for preventing fraudulent operation of such apparatus by insertion of a coin, check or other metal disc, differing in any of its properties from that which is intended to operate the device.

The invention comprises essentially a combination of devices operable to differntially select a coin or check of certain definite properties from a coin or check which differs therefrom in any of its properties. The term check will be used hereinafter to include any metal coin, check, disc or other body.

The principal object of the check selecting apparatus of our invention is to provide absolute and positive selectivity of the proper check from all other checks, by subjecting the inserted check to such a sequence of operations depending upon several different essential properties thereof that no check other than the check properly intended to operate the apparatus can possibly pass through the device in the same manner and be delivered through the same delivering means as is the case with the proper check.

A particular object of the invention is to provide a novel and advantageous form of weight testing device, which will positively operate to selectively separate all checks delivered thereto and possessing a certain proper weight from checks delivered thereto and failing to possess such weight.

A further object of the invention is to provide, in connection with a plurality of selecting devices for subjecting a check successively to tests based on different characteristics, means controlled by the operation of the last of said devices for giving a warning signal in case any check other than one having all of the desired characteristics is delivered to the apparatus, such signal being given in case the check is rejected by any one of the preceding selecting devices and hence fails to reach the last testing device as well as in the case of a check which reaches said last testing device but fails to satisfactorily pass said last device.

The selecting apparatus has been designed particularly for use in connection with a change making apparatus which is also of our invention and which is to form the subject matter of a separate patent application. Certain features of the operation of the change making apparatus, however, are co-ordinated with the operation of the selecting apparatus described hereinafter, and the invention covered in this application also includes the operating mechanism which effects the proper co-ordination between the check selecting apparatus and the change making apparatus. It will be understood, however, that the selecting apparatus in itself may be used in conjunction with any other type of change making apparatus or with any form of vending apparatus or other coin operated device or may be used simply for the separation of coins or checks of certain properties from those possessing different propetries, as, for example, in the detection of counterfeit coins.

The accompanying drawings illustrate embodiments of our invention and referring thereto:

Fig. 1 is a side elevation of the apparatus.

Fig. 1ª is a side elevation of part of the operating mechanism in another position.

Fig. 2 is a side elevation from the reverse side.

Fig. 3 is a rear elevation.

Fig. 4 is a vertical section on line 4—4 in Fig. 3.

Fig. 5 is a partial view similar to Fig. 4, showing the parts in a different position.

Fig. 6 is a section on line 6—6 in Fig. 4.

Fig. 7 is a section on line 7—7 in Fig. 6.

Fig. 8 is an enlarged view of the upper portion of the apparatus taken from the same side as in Fig. 1.

Fig. 8ª is a front elevation of the upper end of the coin-receiving chute.

Fig. 9 is a view of the same portion of the apparatus taken from the same side as Fig. 2.

Fig. 10 is a section on line 10—10 in Fig. 4.

Fig. 11 is a section on line 11—11 in Fig. 4.

Fig. 12 is a section on line 12—12 in Fig. 4.

Fig. 13 is a section on line 13—13 in Fig. 12.

Fig. 14 is a section on line 14—14 in Fig. 4.

Fig. 15 is a side elevation of the lower portion of the selecting apparatus taken from the same side as Figs. 1 and 8, showing particularly the means for testing the weight of the check.

Fig. 16 is a view of the same portion of the apparatus taken from the same side as Figs. 2 and 9.

Fig. 17 is a horizontal section on line 17—17 in Fig. 15.

Fig. 18 is a horizontal section on line 18—18 in Fig. 15.

Fig. 19 is a vertical section on line 19—19 in Fig. 15.

Fig. 20 is a perspective view of certain elements of the weight testing mechanism.

Fig. 21 is a plan view of the change making mechanism.

Fig. 22 is a vertical section on line 22—22 in Fig. 21.

Fig. 23 is a rear elevation of a portion of the change making apparatus.

Fig. 24 is a wiring diagram of the apparatus.

The apparatus may comprise as shown a base 1 and a front panel board or plate 2, secured to said base in any suitable manner and braced as by means of bars 3. A check receiving chute 4 is mounted adjacent the upper end of panel 2, as by means of angle bars 6, said chute having a portion 4' projecting in front of panel 2 and provided with an opening 7 of just sufficient diameter to permit insertion of a check having the desired diameter. The other side wall of chute 4 is provided with an opening 8, which is of somewhat less diameter than the opening 7 so as to prevent the check so inserted from being pushed through said opening 8. A knife edge or other sharp-edged member 9 is mounted adjacent one of the side walls of chute 4 and just behind the edge of opening 7, the spacing between said knife edge and the opposite side wall of said chute being just sufficient to permit passage of a check of the desired thickness.

The chute 4 is provided with a downwardly and rearwardly inclined check conducting passage 12 through which any round check which is of small enough diameter to be inserted in opening 7 and of small enough thickness to pass knife edge 9 is permitted to roll. A contact member 14 is mounted upon the end of arm 15 which is pivotally mounted as at 16 on bracket 17 secured to one side of chute 4. Suitable insulating means 20 is provided between contact member 14 and arm 15. Contact member 14 is provided with two contact arms 18 and 19 projecting through openings 21 and 22 in the respective side walls of chute 4, and a spring 23 is provided which presses inwardly on arm 15 so as to normally hold the contact arm 18 in position to obstruct passage 12, and arm 19 just clear of said passage, as shown in Fig. 6. Openings 21' and 22' are provided opposite the openings 21 and 22 respectively, so as to permit arms 18 and 19 to be moved entirely across the passage 12 and into or through openings 21' and 22' without making contact with the walls of chute 4.

Brackets or frame members 24 are mounted at the respective sides of chute 4, and shaft 26 is rotatably mounted in bearing means 27 on said brackets. A revolving gate or rejecting member 29 is loosely mounted on shaft 26 and is provided with a passage 31 which is aligned with the passage 12 when said gate is in normal position, a leaf spring 32 mounted upon panel 2 engaging pin 33 on said gate to normally hold the same in such normal position. A cam member 34 may be secured to shaft 26 as by means of set screw 36 and is provided with a notched or cut out portion 37, the opposite end faces 38 and 39 of said cut out portion being adapted to engage pin 41 on gate 29 to cause operation thereof as hereinafter described. Cam member 34 is also provided with an inclined cam face 42 operable to engage lug 43 on arm 15 and move said arm outwardly as hereinafter described.

A detaining magnet 46 is mounted as by means of brackets 47 so as to embrace chute 4 and gate 29, the opposite poles 48 of said magnet being disposed in position at the opposite sides of the passage 31 in gate 29 so that a check passing through said passage must pass between said pole pieces. Said magnet may be a permanent magnet as shown, or if desired an electromagnet may be used. Bushings 49, of soft iron or other suitable metal of high magnetic permeability but possessing a minimum residual magnetism, are mounted upon the gate 29 at opposite sides of passage 31 therein and normally in position directly between poles 48 so as to form pole pieces for magnet 46 when in said position. The space between said bushings is just sufficient to permit passage of the proper check therethrough, while the outer faces of the bushings barely clear the poles 48, so that when a check of magnetically permeable material is interposed between said bushings, a substantially uninterrupted magnetic circuit is produced, and a minimum strength of magnetic properties in such check will suffice to cause it to be held between bushings 49 so long as said bushings remain in position between the ends of magnet 46.

A stop member 52 is formed at the end of arm 53 which is pivoted at 54 on supporting bracket 55. Said arm is provided with a lug 56 in position to be engaged by inclined face 57 on cam member 58, said cam member being secured to shaft 26 as by means of set screw 59. A spring 61 is provided which tends to hold stop member 52 in the position shown in Fig. 6, at which time said stop member projects through an opening 62 in the side wall of revolving gate 29 and across the passage 31 through said gate so as to cause a check moving in said passage to be arrested in position between the poles of magnet 46. A pin 63 may be secured to stop member 52 and adapted to engage the outer face of chute 4 to limit inward movement of said stop member.

Shaft 26 may be connected by arm 66, link 67 and arm 68 to a driving shaft 69 which may be operatively connected through suitable reducing gear mechanism in housing 71 to an electric motor 72. Suitable limit switch mechanism, as hereinafter described, may also be provided in housing 71 for causing motor 72 to rotate shaft 69 through one revolution each time the circuit is completed by insertion of a metal check.

At a point in chute 4 beyond the revolving gate and retaining magnet above described are provided means for creating a strong magnetic flux across the passage 12 in said chute by means of one or more magnets disposed in position to concentrate their flux across said passage. Such means may comprise, as shown more particularly in Fig. 12, two horseshoe magnets 76 mounted on brackets 75 secured to chute 4. Said magnets may be permanent magnets as shown, or if desired electromagnetic means may be used. The like poles of said magnets are secured to common pole pieces 77 provided with L-shaped projections 78 formed thereon or secured thereto, whose inner ends 79 project through the side walls of chute 4 as shown in Fig. 13 so as to conduct the magnetic flux into close proximity to the check as it passes down said chute and to concentrate said flux through a small portion of said check.

Chute 4 opens at its lower end and just beyond the retarding magnets 76, into an enlarged housing 81 providing a passage 82 between the side plates 83 thereof, said passage being only slightly greater in width than the thickness of the check designed to pass therethrough but having a sufficient extension in the plane of said check to permit the check to follow different paths therethrough due to gravity, depending upon the weight of said check and the velocity with which it leaves chute 4. Within the passage 82 is provided an anvil or impact member 86 which may be of steel or other suitable metal or of bakelite or any other suitable material and is of sufficient size and weight to cause the check falling thereon to rebound as desired. Said anvil is placed, as shown, below and somewhat beyond the lower end of chute 4, so that a check leaving the lower end of said chute at exactly a predetermined velocity will strike said anvil squarely on its impact face 87 and rebound in the desired manner provided such check possesses the proper resilient qualities.

Beyond and somewhat above anvil 86 is provided an adjustable deflecting member 88 which may be set in any desired position in slots 89 in the walls 83, said deflecting member comprising, for example, a metal sleeve or section of tubing held in position by means of screw 92 and nut 93. Deflecting member 88 may be set in such position that a check striking impact member 86 squarely and having the proper resiliency will rebound over said deflecting member, while any check of less resiliency will strike said deflecting member and be thrown back into passage 82. At the other side of said deflecting member is provided a downwardly extending chute 94 into which any check which rebounds over said deflecting member will fall. The end of passage 82 above said chute may be closed by a wall 95 so as to prevent any check from escaping at this point and guide all of the checks passing over deflecting member 88 into the chute 94.

Housing 81 is formed to provide passages 96 and 97 in front of and beyond anvil 86, so that any check failing to strike the impact face 87 of said anvil, or failing to strike said impact face squarely and rebound over deflecting member 88, may fall through one or the other of said passages. Housing 81 may be continued on downwardly and have its lower end formed as a chute 98, leading to the hopper 221 hereinafter described. A chute 99 is provided beneath gate 29 for receiving checks rejected thereby, said chute leading for example into housing 81 at such point that any checks discharged therethrough will not fall upon impact member 86 in such manner as to rebound over deflecting member 88, but will pass down through chute 98. If desired, deflecting members, as indicated in dotted lines at 100 in Fig. 4, may be mounted in suitable positions in one or more of the slots 100' in side walls 83, such slots serving to permit adjustment of said deflecting members in the same manner as deflecting member 88 aforesaid. If such deflecting members are used, any checks leaving chute 4 at other than the proper velocity will strike said members and thus be prevented from striking impact member 86 in such manner as to rebound over member 88.

Beneath the resiliency testing means above described is provided the weight testing mechanism, which may be mounted on a supporting frame 101 secured to the front panel 2. A vertical shaft 102 is mounted in bearings 103 on said frame. Receiving chute 105 and selective delivering chutes 106 and 107 are secured to a vertical supporting arm 108 at the outer end of bracket 109 which is loosely mounted on shaft 102. The bottoms of said chutes are inclined as indicated in dotted lines at 105', 106' and 107' respectively in Fig. 16.

The chutes 105, 106, and 107 are disposed in closely spaced vertical planes and the horizontal dimension of each chute is only slightly greater than the thickness of the check to be tested. Said chutes are normally held in the position shown in Fig. 17 by means of spring 111 between the upper arm of bracket 109 and upper frame member 101. When in this position the receiving chute 105 is directly beneath the lower end of chute 94 aforesaid. A bolt 110 extends through bracket arm 109 and spring 111 and is secured to frame member 101 by means of nuts 112. The head 115 of said bolt limits the outward movement of said bracket and the chutes carried thereby.

A balance member 113 is mounted by arm 114 on leaf spring 116 which is secured to frame 101 by bracket 117. Balance member 113 is provided with side walls 120 spaced so as to provide a space 118 of sufficient width to receive the check and hold the same in a substantially vertical plane and said space is directly in line with chute 105 when said chute is in normal position, as shown in Fig. 17. The bottom 125 of balance member 113 is notched as at 125' so as to hold any check deposited therein in fixed position until ejected. An arm 148 may, if desired, be secured to balance member 113 and may be provided at its outer end with a disk or plunger 149 working in a body of oil or other suitable liquid in chamber 150, which serves as a dash-pot to make the balance member "dead-beat" and prevent oscillation thereof. Secured to balance member 113 is an arm 119 which is bent at its forward end so as to move over or in close proximity to the face of frame 101. A pin 121 is secured to the supporting member 108 for the chutes 105, 106 and 107 and is provided at its outer end with a portion 122 of reduced thickness which extends through opening 123 in arm 119 and through opening 124 in frame 101.

The relation of pin 121 to arm 119 is such that when balance member 113 is empty or contains a check of less weight than that of the check intended to be selected, said pin will not pass through the opening 123 upon inward movement of bracket 109 and the chutes carried thereby, as hereinafter described, due to engagement of shoulder 127 on said pin with the face of arm 119, as shown particularly in Figs. 19 and 20. If, however, the balance member is lowered to a certain extent, due to the weight of a check having the desired characteristics, the arm 119 and opening 123 will be lowered sufficiently, as indicated in dotted lines at 119' and 123' in Fig. 20, to permit the pin 121 to pass freely through opening 123 and opening 124. On the other hand, if the balance member is lowered too far as by deposition therein of a coin heavier than that desired, the arm 119 will be lowered still further so that inward movement of pin 121 will, in that case, be limited by engagement of a shoulder 126 thereon with said arm. The shoulders 126 and 127 are so located that when either of them engages the arm 119 as above described, to limit inward movement of the chutes 106 and 107, the chute 107 is arrested in position of alinement with the check holding space 118 of balance member 113, while if arm 119 is in position to be cleared by both of said shoulders, the chute 106 may be moved over into alinement with said check-receiving space.

Arm 130 may be secured to shaft 102 and may be provided at its outer end with a member 131 extending through an opening 133 in bracket 109, a compression spring 132 being placed around the member 131 and between members 130 and 109. Shaft 102 may be rotated by means of a lever arm 136 secured thereto and provided at its forward end with a roller 137 in position to be engaged by cam means 138 on a segment 139 secured to shaft 141. Arm 142, link 143, and arm 144 serve to operatively connect shaft 141 to shaft 26 aforesaid, the link 143 being provided with a longitudinal slot 146 sliding on pin 147 on arm 142 so as to permit limited movement of link without causing motion of arm 142 but to cause said arm to be moved at each end of the stroke of said link.

Resilient electrical contact member 151 may be mounted as at 152 on bracket 101, being electrically insulated therefrom by insulating means 155, said contact member being normally held out of contact with the upper arm of bracket 109 by means of pin 153 at the end of arm 154 which is secured to the upper end of shaft 102. An adjusting screw 156 may be provided for regulating the pressure against said contact member.

An ejecting arm 157 may be loosely mounted on shaft 141 and may be provided at its upper end with a portion 158 projecting through an opening 159 in the side of balance member 113 and across the space 118 therein, so as to push the check out of said balance member upon movement of said arm as hereinafter described. Segment 139 is provided with a pin 161 adapted to engage arm 157 and move the same to effect such ejection of the coin.

The above described check selecting mechanism may be employed in conjunction with any suitable apparatus which is operable by or under control of a coin or metal check such as a change making apparatus, vending apparatus or the like, or it may be employed separately for the detection of counterfeit coins or fraudulent checks. In any event the checks possessing the desired characteristics are delivered through chute 106 as hereinafter described, while all other checks are delivered either through chute 98 or through chute 107. A chute 162 may be provided for receiving checks delivered through chute 107 and conducting the same to hopper 221.

When used in connection with the change making apparatus shown, a chute 166 is provided which is open at its upper end as at 167 in position to receive a coin delivered through chute 106 when the latter is in the position shown in Fig. 18. The change making mechanism comprises a supporting base 168 mounted as by means of supporting bracket 169 on the front panel 2. Arms 170 may also be secured to bracket 169 or base 168 and to chute 166 so as to support the latter. A shaft 171 may be rigidly secured to base 168 and to a lower supporting member 172. Mounted upon base 168 are a plurality of vertical change holding tubes 173, 174, 175, 176, 177 and 178, which may be adapted to hold coins or checks of any desired sizes or denominations. In the particular apparatus shown the tube 173 is adapted to hold fifty-cent pieces, the tube 174 quarters, tube 176 dimes, and tubes 175, 177 and 178 nickels, and the mechanism may be operated so as to deliver change for any United States silver coin from a dime to a dollar. A hub portion 179 is secured to shaft 171 as by pin 181, and a bearing ring 182 is secured to said hub portion.

Above said bearing ring and directly beneath base 168 are provided a plurality of change delivering segments 183, 184, 185 and 186, there being one of said segments corresponding to each coin or check by which the apparatus may be operated, that is in the present instance dollars, half-dollars, quarters and dimes. Said segments are rotatable independently about shaft 171, being provided with inwardly projecting portions 187 engaging said shaft so as to cause the segments to move about said shaft as a center. The upper surface of bearing ring 182 forms a bearing surface for all of said segments. Each of the change delivering segments is provided with a recess or recesses which may be moved into position beneath the respective change holding tubes aforesaid or into position beneath corresponding openings in bearing ring 182. In the machine shown in the drawings, for example, segment 183 is provided with opening 189, which in the position shown is directly beneath tube 173 but may be moved into position over opening 191 in ring 182; segment 184 is provided with a recess 192 movable between a position beneath tube 174 and a position over opening 193; segment 185 is provided with recesses 194 and 195 movable respectively between positions below tubes 175 and 176 and positions above openings 196 and 197; and segment 186 is provided with recesses 198 and 199 movable respectively between positions beneath tubes 177 and 178 and positions above openings 201 and 202. The vertical distance between bearing ring 182 and base 168 is preferably just sufficient to accommodate a coin of the maximum thickness of those to be delivered, while the segments 183 and so on are only as thick as the thinnest coin to be delivered, so that each time one of the recesses therein is moved into position beneath the corresponding change holding tube, one coin will drop from said tube into said recess.

Outside the change delivering segments above described is provided an operating ring 206 which is provided with an inwardly extending flange 207 bearing upon annular shoulder 208 on the bearing ring 182 aforesaid. Each of the segments above mentioned may be provided at its edge with a notch 209, which is of a depth less than the diameter of the coin or check intended to operate such segment and may, for example, be approximately one-half or less of such diameter. Operating ring 206 may be provided with coin receiving pockets 211, 212, 213 and 214 which are movable into position of alignment with the notches 209 in the respective change delivering segments and are adapted to receive dollars, half-dollars, quarters and dimes respectively. Each of said coin receiving pockets is open at the top and bottom (see pocket 212 in Fig. 22) and segmental flanges 216 may be secured to ring 182 so as to support the checks or coins in the respective pockets. A pin 219 may be projected upwardly from flange 107 of ring 106 to engage the segment 186 upon counter-clockwise rotation of said ring as hereinafter described.

A hopper 221 is mounted upon panel 2 in position to receive change passing through the openings 191, 193, etc. in ring 182, upon operation of the machine as hereinafter described, said hopper being adapted to deliver such coins through opening 222 into the change delivering cup 223 in front of panel 2.

The check selecting mechanism above described is adapted only for the selection of United States silver fifty-cent pieces and is adapted to deliver such coins only, through chute 166 aforesaid, into the pocket 212 as hereinafter described. The change making apparatus, however, is adapted as above mentioned to make change for coins of other denominations as well, it being understood that such other coins may be delivered through similar check selecting devices, and through chutes shown in dotted lines at 226, 227 and 228, to the other coin receiving pockets 211, 213 and 214 respectively. A chute 231 is secured to ring 182 just beyond one end of flange 216 beneath pocket 212 so as to receive the coin discharged from said pocket upon movement thereof beyond the end of flange 216 as hereinafter described, and it will be understood that similar discharge chutes may also be provided for conducting away the coins from the other coin receiving pockets. Chute 231 may open at its lower end into any suitable receptacle 232 for the coins discharged therethrough.

The operating mechanism for the change making apparatus may comprise a flexible clevis 236 mounted on operating ring 206 by means of bolt or pin 237, a connecting rod 238 connecting said clevis to lever arm 239 on shaft 240. Said shaft may be rotatably mounted in bearings 241 at the rear end of hopper 221 and may be provided adjacent its other end with a lever arm 242 connected by link 243 to arm 244 on the motor driven shaft 69 aforesaid. In order to permit limited freedom of movement between arm 244 and link 243 said link may be provided with a slot 245 engaging pin 246 which may be adjustably secured in slot 247 on said lever arm. An arm 248 is also secured to shaft 240 and is provided at its lower end with a roller 249 adapted to engage a cam member 251 on shaft 69, said cam member being provided with a notch 252 extending throughout a portion of its periphery and having a shoulder 253 adapted to engage said roller as hereinafter described.

In order to prevent insertion of a coin or check in the apparatus when the electric power is off and the device is, therefore, inoperative, suitable closure means for the openings 7 and 8 in chute 4 may be provided. Such means may comprise, for example, a yoke 260 having arms 261 loosely mounted on shaft 26. Closure members 262 may be mounted upon the yoke 260 at the respective sides of chute 4. Said closure members are normally held in raised position so as to leave the openings 7 and 8 unobstructed, by means of the solenoid or electromagnet 263, mounted upon bracket 264, the armature 265 of said solenoid being pivotally mounted at 266 and being connected by link 267 to one of the arms 261 aforesaid. As long as solenoid 263 is energized the parts are held in the positions shown, but upon de-energization of such solenoid the members 265, 267, 261 and 262 are moved by gravity to the positions indicated in dotted lines at 265', 267', 261' and 262' in Fig. 8 so as to close the openings 7 and 8 and prevent insertion of a coin or check therethrough. In order to prevent raising of the closure members 262 except when the solenoid 263 is energized, a catch member 269 may be pivoted as at 270 and provided with an arm 271. A small leaf spring 272 engages the lower end of said arm and tends to hold catch member 269 in raised position as shown. Upon de-energization of solenoid 263, however, the forward end of link 267 engages the lower end of arm 271 as indicated in dotted lines at 273 and depresses said arm and the catch member 269 to the position shown in dotted lines at 269' so as to cause said catch member to engage a projection 274 on one of the closure members 262 and prevent the same from being raised. It may be seen, however, that when solenoid may be again energized the link 267 will be drawn away from arm 271 and permit spring 272 to restore catch member 269 to normal position. Link 267 may be slotted as shown at 276 so as to permit said link to move sufficiently to thus release the catch member, in spite of the fact that the closure members and arms 261 are held from movement. After the catch member has been released the forward end of said slot engages pin 277 on arm 261 to raise the same to the position shown.

The electric circuit for the check selecting and change delivering apparatus may comprise as shown in Fig. 24 supply wires 280 and 281 connected to any suitable source of electric power supply, for example, a commercial 110 volt supply line. A switch 282 may be provided in one of said wires for turning on or off the supply of power to the apparatus. Wire 283 may lead from wire 281 to the electric motor 72, the other side of said motor being connected by wire 284 to a circuit closing relay switch 285, whence wire 286 leads to the other supply wire 281. A step-down transformer such as an ordinary bell ringing transformer 287 may be connected by wires 288 and 289 to the power supply wires 280 and 281, the secondary of said transformer being connected by wire 291 to the winding 292 of relay switch 285 aforesaid. The other side of winding 292 may be connected by wires 293 and 294 to the contact member 14. Wire 295 may lead from the other side of the secondary winding of transformer 287 to any suitable part of the apparatus which is electrically connected to chute 4, for example, to one of the angle bars 6 supporting said chute as shown in Fig. 3, said wire being shown in Fig. 24 as connected directly to chute 4.

A limit switch 297 of any suitable type may be provided on shaft 69, said limit switch comprising, for example, as shown diagrammatically in Fig. 24, a contact ring 298 secured to said shaft and insulated therefrom and provided with a cut-out portion or insulated segment 299, said insulated segment extending only partially across said contact member. A brush 301 may be mounted in position to engage said insulated segment and the outer portion of ring 298, while brush 302 may be mounted in such position as not to engage said insulated segment, but to continually engage ring 298, upon rotation of said ring. The brush 301 may be connected by wire 303 to wire 293 leading to relay winding 292, while brush 302 may be connected by wire 304 to the secondary winding of transformer 287.

Wire 306 may lead from one side of the secondary winding of transformer 287 to the resilient contact member 151 of the weight testing mechanism, while wire 307 may connect frame 101 or any other suitable part electrically connected to bracket 109 with which said resilient contact member is adapted to make contact, to an electrically operated bell or other signal or alarm device 308, whence wire 309 leads back to the other side of the secondary winding of the transformer.

Solenoid 263 may be connected by wires 311 and 312 to the supply wires 280 and 281.

The operation of the apparatus may be described as follows: It is first placed in operative condition by completing the electric circuit as by closing switch 282, whereupon solenoid 263 is energized and operates through armature 265 and link 267 to release catch member 269 and raise the closure means 262 to the position shown, for example, in Fig. 8, thus exposing the opening 7 for insertion of a coin. Any coin or check whose diameter is not greater than that of opening 7 may then be inserted, through said opening, into the upper end of passage 12 as shown at A in Fig. 4, but it will be seen that any check of too great a diameter is positively prevented from insertion in the apparatus. Upon insertion of the check in this manner it will roll down the passage 12, provided its thickness is no greater than the clearance between the sharp-edged member 9 and the opposite side wall of chute 4. If the thickness of the coin is greater than this clearance it is prevented from passing down in passage 12 and may be easily removed by inserting the finger through the opening 8 and forcing the coin back through opening 7.

Any check which is thus permitted to pass member 9 will roll or move in passage 12 until it strikes contact arm 18 as shown at B in Fig. 4, thus completing an electric circuit as follows: from the secondary winding of transformer 287, through wire 295 to the chute 4, through the metal check to arm 18 on contact member 14, wires 294 and 293, solenoid 292 and wire 291 back to the transformer. Switch 285 is thus closed due to energization of solenoid 292 and the motor circuit is completed through wire 286, switch 285, wire 284 and wire 283. Motor 72 being thus set in operation, shaft 69 is rotated at a suitable speed and contact ring 298 is rotated sufficiently to make contact with brush 301 whereupon an additional circuit is established for solenoid 292, through wire 303, brush 301, contact member 298, brush 302, and wire 304. The motor circuit will, therefore, be kept closed regardless of the passage of the check out of contact with arm 18.

Rotation of shaft 69 then operates through arm 68, link 67 and arm 66 to rotate shaft 26 and cam member 34 thereon so as to cause inclined face 42 to engage lug 43 and move arm 15 outwardly, thus withdrawing arm 18 from passage 12 and permitting the check to proceed further in said passage. It should be noted at this point, however, that since arms 18 and 19 move together, the latter arm enters passage 12 as the former is withdrawn therefrom. By this means, if a second check is inserted in chute 4 before the first check has been released by arm 18, or during the time that arm 18 is withdrawn from the passage, this second check will engage arm 19 and be held back thereby until said arm is withdrawn as hereinafter described. The operating mechanism is so arranged that shaft 69 is rotated sufficiently to close connection between brush 301 and contact ring 298 before the cam member 34 operates to cause withdrawal of contact arm 18 from passage 12, so as to prevent breaking the circuit of motor 72 at this time.

Upon being released by arm 18, the check will proceed until it engages stop member 52 and will be arrested thereby in position directly between the iron bushings 49 between the poles 48 of magnet 46, as shown at C in Fig. 6. Any check consisting of iron or nickel or other magnetically attracted metal, or containing sufficient amounts of such metal to cause the same to be magnetically attracted to any appreciable extent, will be magnetically held in position between said bushings. Upon continued rotation of shaft 26 the inclined face 57 on cam member 58 will engage lug 56 and move arm 53 outwardly so as to remove stop member 52 from passage 12. Any check, however, which is magnetically held will remain in position between bushings 49 regardless of such withdrawal of said stop member. Further rotation of shaft 26 causes the shoulder 38 on cam member 34 to engage pin 41 and rotate the revolving gate 29 in a clockwise direction in Figs. 4 and 7. The arrangement is such that by the time the bushings 49 and the check which is held between said bushings are thus moved out of position between the poles of magnet 46, the bottom of the passage 31 in gate 29 has been rotated past the horizontal and has a reverse inclination as shown in Fig. 5 so that when the check is released from between said bushings it will roll back in said passage, as indicated at C' in Fig. 5, and will finally be discharged therefrom through chute 99, as indicated at C'', when said gate reaches a position such as indicated in dotted lines at 29'.

Any check thus discharged will fall through passage 82 and chute 98 into hopper 221 and hence out into cup 223, without effecting operation of the change delivering or other apparatus to which the check selecting apparatus is connected and it will thus be seen that any coin or check having appreciable magnetic properties will be prevented from operating the machine. It should be pointed out, however, that the main purpose of retaining magnet 46 and gate 29 is not to directly prevent operation of the machine by coins or checks having magnetic properties, but rather to prevent any such coins or checks from passing on into the zone of strong magnetic flux between the poles of retarding magnets 76 since any coin of this character would be permanently held in such zone and prevent further operation of the machine.

Any check which does not possess sufficient magnetic properties to be held back by retaining magnet 46, even when arrested directly between the poles thereof as above described, will be released upon withdrawal of stop member 52 and will roll on down in passage 12. Upon reaching the position indicated at D in Fig. 4 and passing between the projections 79 connected to the pole pieces 77, a strong magnetic flux is passed at relatively high concentration or density through said check, and the motion of such check through said magnetic flux will cause electric currents, commonly known as eddy currents, to be set up therein and will at the same time exert a retarding force upon the check, the strength of such force, for a given strength of magnetic field, depending primarily upon the electrical conductivity of the check. The strength of the retarding force thus exerted upon the check will influence the velocity thereof and thus determine the velocity at which the check is discharged from the lower end of passage 12. Magnets 76 are of such strength and impact member 37 is so placed that a check of the character to be selected and consisting of metal having a certain electrical conductivity will leave said passage at just sufficient velocity to cause it to fall in the path indicated at E in Fig. 4 and to strike squarely upon the upper face 87 of impact member 86, as indicated at F. Any check formed of a metal having a different electrical conductivity will leave said passage at a velocity different from that of the proper check and will follow some other path such as indicated at E'. Such other check may fall entirely clear of impact member 86 as shown at E'' or it may strike the impact face 87 but at such angle as to cause it to fail to rebound over deflecting member 88 and thus be thrown back and pass downwardly at one side or the other of said impact member. In the case of any check which is not round, it will be caused to slide, instead of rolling, down the chute 4, and due to the greater frictional resistance its velocity at the time of leaving said chute will not be great enough to cause it to strike impact member 86 or at least to strike it in such manner as to rebound over deflecting member 88.

Furthermore, even though a check is round and possesses the proper electrical conductivity, and therefore strikes impact member 86 squarely, it will still be rejected unless it also possesses the proper resiliency. If the check so striking the impact member has exactly the resiliency of the check to be selected, it will rebound over deflecting member 88 as indicated at G and pass downwardly through chute 94, but if it is of less resiliency it will fail to rebound sufficiently and hence will strike such deflecting member and fall through space 97 or 96 and chute 98. If desired, a second deflecting member 88' may also be mounted in the upper portion of slots 89 so as to provide sufficient clearance between deflecting members 88 and 88' for passage of the proper check, such additional deflecting member serving to prevent any check having a greater resiliency or rebound than that to be selected from entering chute 94. Such additional deflecting member is not necessary for the selection of silver coins or checks, however, since the resiliency thereof is greater than any of the other metals commonly employed as fraudulent substitutes therefor in the operation of check controlled apparatus. If desired, other deflecting members similar to deflecting member 88 may also be mounted in any of the slots indicated at 100', in position to deflect any coin failing to follow the path such as indicated at E and to cause the same to fall through chute 98. Any check or coin failing for any of the reasons above mentioned to pass over deflecting member 88 and enter chute 94 will be delivered through chute 98 and hopper 221 to cup 223.

Any check entering chute 94 is directed therethrough into receiving chute 105 and rolls downwardly through said chute and into the balance member 113, coming to rest in the notched portion 125' of the bottom of said balance member, as indicated at H. Such check is thus always arrested at a definite equal distance from the point of suspension of leaf spring 116, and balance member 113 will be depressed by an amount directly dependent upon the weight of such check. If the check thus deposited in such balance member has exactly the weight of the check to be selected, said balance member and the arm 119 secured thereto will be depressed sufficiently to bring the opening 123 on said arm directly in line with pin 121, as described above with reference to Fig. 20.

The operating mechanism is so arranged and timed that vertical shaft 102 of the weight testing mechanism is set in rotation at a certain predetermined time after the closing of the motor circuit. This movement is accomplished through arm 144 on shaft 26, link 143, and arm 142. Since the initial movement of arm 144 is in a counterclockwise direction in Fig. 2 it is evident that such arm must be moved past dead center position with respect to link 143, whereafter the upward movement of arm 144 operates to lift said link, and bring the end of slot 146 into engagement with pin 147 and operate through arm 142 to rotate shaft 141 and cam segment 139 in a clockwise direction in Fig. 16. The inclined or curved cam face 138 thereon engages roller 137 and causes arm 136 to be moved from the position shown in Fig. 17 in a clockwise direction toward the position shown in Fig. 18.

Shaft 102 is thereupon rotated in a clockwise direction, referring to Figs. 17 and 18, and arm 130 operates through spring 132 to move bracket 109 and the chutes 105, 106 and 107 carried thereby inwardly toward frame 101. If opening 123 has been brought into alignment with pin 121 as above described, due to deposition of a check of the proper weight in balance member 113, said pin is permitted to move through said opening and through the opening 124 until chute 106 is brought into line with the space 118 of said balance member, as shown in Fig. 18. The cam segment 139 is provided with a flat face 138' beyond the curved portion 138, a roller 137 riding upon said flat portion during the latter part of the movement of said cam segment so that there is no tendency to move chute 106 beyond the position shown in Fig. 18. During the latter part of the movement of segment 139 the pin 161 thereon is brought into engagement with ejecting member 157 and moves the same to the position indicated in dotted lines at 157' in Fig. 15, thus forcing the coin out of recess 125' and ejecting the same from the balance member. If the chutes are at this time in the position shown in Fig. 18, such check rolls down through chute 106 into chute 166 and is delivered therethrough to the change making apparatus.

In case the check has been rejected before reaching the weight testing mechanism, due to any of the reasons above mentioned, the balance member 113 will not be depressed as above described and opening 123 will, therefore, not be aligned with pin 121, so that upon inward movement of bracket 109 the lower shoulder 126 on said pin will engage the face of arm 119 and cause said bracket to be arrested in an intermediate position in which chute 107 is in line with the space 118 of the balance member. The operation will be the same in case a check of less than the proper weight is deposited in the balance member, for in that case arm 119 will not be lowered sufficiently to bring the opening 123 in line with pin 121. Furthermore in case a check of greater weight than that of the desired check is deposited in the balance member, such balance member and arm 119 will be lowered too far so that opening 124 will be moved beyond the position of alignment with pin 121 and the upper shoulder 127 on said pin will engage said arm upon inward movement of bracket 109.

In any of the three cases last mentioned, that is, in the case of no check being deposited in balance member 113 or in case of a check of too little or too great a weight being deposited therein, the bracket 109 will be arrested in the intermediate position stated. Arm 130, however, is permitted to complete its motion by compression of spring 132. As arm 130 continues to move inwardly and bracket 109 is held stationary, the pin 153 on arm 154 also moves inwardly and permits resilient contact member 151 to make contact with the upper arm of bracket 109. The circuit of electric bell 308 is thus completed through wire 306, contact member 151, bracket 109 and the supporting frame therefor, wire 307 and wire 309, and such bell will be caused to ring, giving an audible indication either that someone is attempting to operate the machine with a fraudulent check or slug or else that the machine is not operating properly. It should be noted particularly that while the contact mechanism controlling the giving of this alarm is operated by the weight testing mechanism, it operates not only in case of a check of improper weight, but also in case the check is rejected for any of the other reasons above described and thus fails entirely to reach the weight testing mechanism.

With the bracket 109 arrested in the intermediate position stated, in which chute 107 is aligned with the balance member 131, operation of ejecting member 158 will cause any check which is in position in said balance member whether of too great or too little weight, to be discharged through chute 107, and such check will pass out of the end of said chute and into chute 162 and hence through hopper 221 to cup 223. It may be seen, therefore, that any check which is rejected by the check selecting mechanism, due either to magnetic property, incorrect electrical conductivity, incorrect resiliency, or incorrect weight, will be returned to cup 223, from which it may be taken by the person who inserted it, but an alarm will be given to the owner or attendant of the machine, by the ringing of bell 308.

While the check selecting mechanism is operating as above described, rotation of shaft 69 also operates through arm 244, link 243, arm 242, shaft 240, arm 239 and rod 238 to rotate the operating ring 206 of the change making mechanism in a counter clockwise direction in Fig. 21. The construction is such that when arm 244 reaches the position shown in Fig. 1ª said operating ring has been moved back sufficiently to cause the pocket 212 to pass beyond the end of segment 216 as shown at 212' in Fig. 23 so that any check previously held in said pocket will be released and fall through chute 231 into the receptacle 232.

Referring to Fig. 1ª it will be noted that arm 248 has by this time been moved into position within the notch 252 on cam member 251 and that a slight further rotation of shaft 69 will cause shoulder 253 on said cam member to engage roller 249 and move arm 248 to the position indicated in dotted lines at 248', thus causing a slight clockwise rotation of actuating ring 206 so as to bring the pocket 212 to the position indicated at 212'' in Fig. 23, just above the edge of segment 216, so that any coin then delivered through chute 166 into said pocket will be held therein as indicated at K, such check projecting into the notch 209 of segment 184. It may be pointed out that the actual distance through which pocket 212 is moved from the position 212' to the position 212" is very small, such distance being exaggerated in Fig. 23 for the purpose of illustration. The notches 209 of the several segments are of sufficient width so that this slight movement of the coin receiving pockets, such as 212, will not move such pockets out of alignment with the respective notches.

Upon further rotation of shaft 69 toward the position shown in Fig. 1 arm 244 will operate through the mechanism above described to rotate actuating ring 206 in a clockwise direction in Fig. 21 and if a check has been deposited in pocket 212 it will act as a key to cause segment 184 to be rotated therewith. The segments 185 and 186 will also be pushed by segment 184 so that all of the segments with the exception of 183 will be rotated together so as to bring the recesses 192, 194, 197, 201 and 202 into change delivering position as shown in Fig. 21. The several coins or checks held in these respective recesses will then fall through the corresponding openings in the bearing plate 182 and hence pass through hopper 221 to the change delivering cup 223 from which they may be taken by the person operating the machine.

It will be seen that the segments thus moved to change delivering position will be returned to position with the recesses 192 etc. beneath the corresponding change holding tubes 174 to 178 inclusive, so as to permit one coin to drop from each change holding tube into the corresponding recess, upon the return movement of the actuating ring at the beginning of the next operation, by means of pin 219 engaging segment 186. At the end of each operation, however, the change making mechanism is in change delivering position and the check receiving pockets thereof such as 212 are out of position beneath the respective chutes such as 166, and means are provided for moving the actuating ring 206 so as to return the respective check receiving pockets to position beneath the chutes through which the checks are delivered thereto during the passage of the check through the check selecting mechanism, the operation being so timed that pocket 212 for example is moved first to its check discharging position as indicated at 212' and then moved back slightly to check receiving position as indicated at 212" before the check is delivered through the chute such as 166.

The sequence of the several selecting operations and of the change delivering operation have been completely described and it remains only to explain the restoration of the parts of the check selecting mechanism to their initial position. During the latter part of each operation arm 68, link 67 and arm 66 operate to rotate shaft 26 in the reverse direction to that above described, thus returning revolving gate 29 to its initial position due to engagement of shoulder 49 with pin 41. Furthermore, the inclined face 57 releases lug 56 and permits spring 61 to return stop member 52 to position within the passage 12 and the inclined cam face 42 releases lug 43 and permits spring 23 to return contact arm 18 to its initial position and withdraw arm 19 from the passage 12. Any check which had previously been held back by arm 19 is thus permitted to roll down against arm 18 so that the apparatus will in that case be immediately started upon a second operation as soon as the first is completed. It is evident, therefore, that contact arms 18 and 19 permit the insertion of any number of checks which may be held in passage 12 above said arms, without waiting for completion of the operation caused by the first of said checks, and any additional checks so deposited will be held until the first operation is completed and will then cause successive operations of the machine until all of such checks have been handled.

The reverse rotation of shaft 26 also operates through arm 144, link 143 and arm 142 to return the cam segment 139 to the position shown in Fig. 16 thus permitting springs 111 and 132 to return bracket 109, chutes 105, 106, and 107 carried thereby, and arm 130 to the position shown in Fig. 17, the head 115 of bolt 110 serving as a stop for bracket 109 and arm 136 engaging frame 101 as shown at 315 in Fig. 16 to serve as a stop for said arm and for the parts rigidly secured to shaft 102. Pin 153 also moves contact member 151 out of engagement with the upper arm of bracket 109 in case such contact has been made as above described. Furthermore, the return movement of cam segment 139 moves pin 161 out of engagement with ejecting member 158 and permits the same to be returned by gravity to its initial position.

The check selecting apparatus shown in the drawings is designed particularly for the selection of United States fifty-cent pieces, but it is apparent that the same sort of mechanism may be used, with suitable changes in design and proportions, not only for the selection of other silver coins, but also for the selection of checks or coins made of other metals. Furthermore, the change delivering mechanism may, with suitable modifications, be employed for delivering any desired combinations of coins, checks, or other articles.

The check-selecting apparatus is adaptable to a wide variety of uses. For example, in addition to being employed in conjunction with change delivering mechanism, it may be used to control the operation of check controlled vending machines or of combined vending and change-delivering machines, or in connection with any other kind of machine which is dependent upon a coin or check for its operation. Also it may be used by government agencies or by banks to detect counterfeit coins, and many other uses may also arise. In any case, however, the apparatus is capable of testing the coin or check for any or all of the following properties.

*Size.*—No coin or check of too great a diameter or too great thickness can be admitted to the chute.

*Roundness.*—Any check which is not round will not leave the chute at the requisite velocity to strike the impact member squarely and rebound as required.

*Magnetic attraction.*—Any check having appreciable properties of magnetic attraction is held by the retaining magnet and subsequently ejected from the main check conducting passage.

*Electrical conductivity.*—Any check possessing other than the requisite electrical conductivity will be retarded by the retarding magnet to a greater or less degree than required, and will either fail to strike the impact member or else will fail to strike it in such manner as to rebound properly.

*Resiliency.*—Any check not having the proper resiliency will fail to rebound into the proper chute, even though it should strike the impact member properly.

*Weight.*—Any check of incorrect weight is ejected from the balance member into separate chute from the checks of correct weight.

It will be understood, of course, that the entire device may be enclosed in any suitable housing or casing, of which the panel 2 may comprise the front wall, so that only the upper end of the check-receiving chute 4 and the change-delivering cup 105 are open to access by anyone desiring to use the machine.

We claim:

1. In a check selecting apparatus, a balance member, means for delivering a check to said balance member, two delivering chutes, means for moving one of said delivering chutes into alignment with said balance member upon deposition of a check of certain weight in said balance member and for moving the other of said chutes into alignment with said balance member upon deposition of a check of other than said certain weight in said balance member, and means for ejecting a check from said balance member into the chute which is thus moved into alignment therewith.

2. In a check selecting apparatus, a weight testing device comprising a balance member, means for delivering a check to said balance member, means for holding a check so delivered at a definite distance from the point of support of said balance member so as to cause vertical movement of said balance member proportional to the weight of a check so deposited, two delivery chutes normally out of alignment with said balance member, one of said delivery chutes being for checks of correct weight and the other for checks of incorrect weight, and means dependent upon the vertical movement of said balance member for causing said first named chute to be brought into position of alignment with said balance member upon delivery of a check of correct weight to said balance member and for causing said second named chute to be brought into such position of alignment upon delivery to said balance member of a check of incorrect weight, and means for delivering the check from said balance member through the delivery chute which is thus brought into alignment therewith.

3. In a check selecting apparatus, a weight testing device comprising a balance member adapted to receive a check, means for delivering a check to said balance member, a pair of chutes, means for relatively swinging said chutes and said balance member to bring one or the other of said chutes into alinement with said balance member, means controlled by said balance member for determining the extent of said relative swing, and means whereby the check is discharged from said balance member into the chute so alined.

4. In a check selecting apparatus, a weight testing device comprising a chute member composed of a chute for spurious checks and a chute for genuine checks, a balance member adapted to receive a check, means for delivering a check to said balance member, means for moving one of said members relative to the other to bring one or the other of said chutes into alinement with said balance member, said moving means comprising an operating element having a constant degree of movement for each operation of the machine, connections between said operating element and the one of said members which is moved thereby, means controlled by said balance member for determining the extent of movement of said moved member, said connections permitting movement of said operating element independent of said moved member when the latter is arrested, and means whereby the check is discharged from said balance member into the chute so alined.

5. A check selecting apparatus according to claim 4 in which the means for determining the extent of movement of the moved member comprises a stop connected to said balance member and having an intermediate position for permitting alinement of said genuine check chute with said balance member, all other positions of said stop causing the alinement of said spurious check chute with said balance member.

6. A check selecting apparatus according to claim 4 in which said balance member comprises a check receiving pocket and a spring on which said pocket is supported.

7. A check selecting apparatus according to claim 4 in which said balance member comprises a check receiving pocket and a horizontal leaf spring secured at one end to a support and having said pocket mounted on its free end.

8. A check selecting apparatus according to claim 4 in which said balance member comprises a check receiving pocket and a spring on which said pocket is supported, and the means for determining the extent of movement of the moved member comprises a stop connected to said pocket and having an intermediate position for permitting alinement of said genuine check chute with said pocket, all other positions of said stop causing the alinement of said spurious check chute with said pocket.

9. In a check selecting apparatus, a weight testing device comprising a chute member having a chute for conducting away checks of proper weight and a chute for conducting away checks of improper weight, a balance member having a pocket adapted to receive and hold a check in a vertical plane, said chutes being disposed in different closely spaced vertical planes normally slightly out of alignment with the vertical plane of said pocket and having their horizontal dimension only slightly greater than the thickness of the checks to be tested, and said chute member being movable substantially perpendicular to the plane of said pocket so as to bring either of said chutes into alignment with said pocket, means for so moving said chute member subsequent to delivery of a check to said pocket, means dependent upon the displacement of said balance member by the weight of said check and adapted to determine the extent of movement of said balance member and thus determine which of said chutes is moved into alignment with said pocket, and means for ejecting said check from said pocket into the chute so aligned therewith after completion of such movement of the chute member.

10. In a check selecting apparatus, a plurality of selecting devices, chute means for conducting genuine checks successively to the respective selecting devices, the respective selecting devices being adapted to separate genuine checks possessing certain different characteristics from spurious checks failing to possess such characteristics and to divert spurious checks so separated from said chute means, whereby only those checks which possess the proper characteristics upon which the selective action of the selecting device or devices preceding the last device depends will be delivered through said chute means to said last device, operating means for said last selecting device, means operable upon delivery of any check to the first of said selecting devices to cause said operating means to operate said last selecting device subsequent to the time required for a genuine check to reach said last device, signalling means, and means dependent upon operation of said last testing device for operating said signalling means unless said check has been delivered to said last device and possesses the proper characteristic upon which the selective action of said last device depends.

In testimony whereof we have hereunto subscribed our names this 21 day of December, 1927.

HUGH E. WURZBACH.
LESLIE H. WADSWORTH.